United States Patent
Nakao

(10) Patent No.: US 12,409,785 B2
(45) Date of Patent: Sep. 9, 2025

(54) UTILITY VEHICLE

(71) Applicant: Kubota Corporation, Osaka (JP)

(72) Inventor: Kohta Nakao, Sakai (JP)

(73) Assignee: Kubota Corporation, Osaka (JP)

( * ) Notice: Subject to any disclaimer, the term of this patent is extended or adjusted under 35 U.S.C. 154(b) by 429 days.

(21) Appl. No.: 17/827,127

(22) Filed: May 27, 2022

(65) Prior Publication Data

US 2023/0173986 A1 Jun. 8, 2023

(30) Foreign Application Priority Data

Dec. 2, 2021 (JP) .................................. 2021-196333

(51) Int. Cl.
  *B60R 7/04* (2006.01)
  *B60R 7/00* (2006.01)

(52) U.S. Cl.
  CPC .............. *B60R 7/005* (2013.01); *B60R 7/04* (2013.01)

(58) Field of Classification Search
  CPC ............ B60N 3/108; B60R 7/005; B60R 7/04
  USPC .................................................. 296/37.8, 70
  See application file for complete search history.

(56) References Cited

U.S. PATENT DOCUMENTS

| | | | |
|---|---|---|---|
| 6,328,191 B1 | 12/2001 | Conley et al. | |
| 6,682,115 B1* | 1/2004 | Tiesler | B60R 7/005 |
| | | | 224/483 |
| 7,413,244 B2* | 8/2008 | Tanaka | B60N 3/108 |
| | | | 224/544 |
| 9,421,916 B1 | 8/2016 | Dyle | |
| 10,059,270 B1* | 8/2018 | Gawade | B60R 7/005 |
| 10,300,772 B1* | 5/2019 | Marsack | B60R 21/13 |
| 2019/0359111 A1* | 11/2019 | Kushimoto | B62D 21/186 |
| 2023/0415659 A1* | 12/2023 | Takada | B60R 7/04 |

FOREIGN PATENT DOCUMENTS

| | | | | |
|---|---|---|---|---|
| DE | 10118427 A1 | * | 10/2002 | ............ B60P 7/0876 |
| DE | 10213313 A1 | | 10/2003 | |
| DE | 10157526 B4 | * | 8/2012 | ............ B60R 7/005 |
| DE | 102018202629 A1 | * | 8/2019 | |
| EP | 1506894 A1 | | 2/2005 | |
| JP | S5611147 U | | 1/1981 | |
| JP | 2002321653 A | | 11/2002 | |
| JP | 2003219723 A | | 8/2003 | |
| JP | 2010058528 A | * | 3/2010 | |
| JP | 2019206218 A | | 12/2019 | |

* cited by examiner

*Primary Examiner* — Joseph D. Pape

(74) *Attorney, Agent, or Firm* — The Webb Law Firm

(57) ABSTRACT

A utility vehicle includes: a driver section configured to accommodate a driver; an interior cover, which is disposed inside the driver section; and a storage section attached to a surface of the interior cover and configured to store an object. The storage section includes: an openable portion, through which the object is taken in and out; and a body, configured to store the object. The openable portion is in a form of a stretchable member.

5 Claims, 3 Drawing Sheets

UTILITY VEHICLE

CROSS REFERENCE TO RELATED APPLICATION

This application claims priority to Japanese Patent Application No. 2021-196333 filed Dec. 2, 2021, the disclosure of which is hereby incorporated by reference in its entirety.

BACKGROUND OF THE INVENTION

Field of the Invention

The present invention relates to a utility vehicle that includes an interior cover disposed inside a driver section.

Description of Related Art

As illustrated in FIGS. 3 and 4 of Patent Literature 1 (Japanese Unexamined Patent Application Publication, Tokukai, No. 2019/206218), a conventional utility vehicle includes a storage section formed at an interior cover that includes a dashboard so that objects such as writing tools can be easily stored in the storage section.

SUMMARY OF THE INVENTION

In the conventional utility vehicle, writing tools, documents, and/or other objects stored in the storage section may fall off and/or be scattered by shaking movement of the vehicle, opposing wind, and/or other occurrences involved in the travel of the vehicle. In view of the circumstances, another conventional vehicle includes a lidded storage section formed at, for example, a dashboard. This storage section, however, has a lock mechanism disposed at the lid, which requires unlocking the lock mechanism in order to open the lid. Thus, in the conventional vehicles, it has been difficult to take objects in and out of the storage section while the vehicles are traveling.

In view of the above-described circumstances, an object of the present invention is to provide a utility vehicle in which objects can be easily stored and taken and which prevents objects from falling off and/or being scattered by shaking movement of the vehicle, opposing wind, and/or other occurrences involved in the travel of the vehicle.

According to features of the present invention, the utility vehicle includes: a driver section configured to accommodate a driver; an interior cover which is disposed inside the driver section; and a storage section attached to a surface of the interior cover and configured to store an object. The storage section includes: an openable portion through which the object is taken in and out; and a body configured to store the object. The openable portion is in a form of a stretchable member.

According to this feature configuration, the storage section has an openable portion formed of a stretchable member. In this configuration, when an object is stored in the body, the object can be slid through the openable portion, making the openable portion open. This eliminates the need for a lid opening operation. After the object is stored in the body, the openable portion contracts into closed state. Even when the object is large and can be stored in the body only partially, the contraction action of the openable portion makes the object held between the surface of the interior cover and the openable portion, ensuring that the object is secured. As a result, the object is prevented from falling off and/or being blown away by shaking movement of the vehicle, opposing wind, and/or other occurrences involved in the travel of the vehicle. When the object is taken out from the storage section, a hand can be inserted through the openable portion. When the object is large and stored in the body only partially, it is possible to manually grasp a part of the object protruding from the body. Thus, the object can be easily taken out without a lid opening operation.

In the present invention, it is preferable that the body is in a form of a stretchable member.

According to this feature configuration, not only the openable portion but also the body is formed of a stretchable member. This ensures that when an object is stored in the storage section, the contraction actions of the openable portion and the body make the object held between the openable portion, the body, and the surface of the interior cover. As a result, the object is more firmly secured.

In the present invention, it is preferable that the openable portion and the body are integral with each other.

According to this feature configuration, the openable portion of the storage section and the body are integral with each other. Thus, it is not necessary to form the openable portion and the body separately, simplifying the step of forming the storage section and the body. It is also not necessary to attach the openable portion and the body to the interior cover separately. This facilitates the work of forming the storage section and the work of attaching the storage section to the interior cover.

In the present invention, it is preferable that the body is in a form of a stretchable net.

According to this feature configuration, the body is formed of a stretchable net. This makes is possible to know what the object is without taking the object out of the body.

In the present invention, it is preferable that: the utility vehicle further includes a driver's seat that is disposed in the driver section and that is for the driver to sit on; and the storage section is disposed at a front cover portion of the interior cover, the front cover portion being away from the driver's seat in a forward direction.

According to this feature configuration, the storage section is disposed at the front cover portion, which is near the driver seated on the driver's seat. This enables the driver to easily take the object in and out of the storage section even while the driver is driving the vehicle.

In the present invention, it is preferable that when the storage section is unoccupied, the openable portion and the body of the storage section extend along a portion of the surface of the interior cover which portion faces a position at which the storage section is attached to the interior cover.

According to this feature configuration, when no object is stored in the storage section, the storage section extends along the surface of the interior cover. This eliminates or minimizes such a disadvantage that the inside space of the driver section is small due to the presence of the storage section.

DESCRIPTION OF THE INVENTION

In the embodiments of the present invention, a front-rear direction is defined based on the assumption that the direction in which the vehicle travels forward is the "front" and that the direction in which the vehicle travels rearward is the "rear", unless otherwise specified. Also in the embodiments of the present invention, a left-right direction is defined based on the assumption that the direction corresponding to the right of the vehicle facing the front in the front-rear direction is the "right" and that the direction corresponding to the left of the vehicle facing the rear in the front-rear direction is the "left".

[Overall Configuration]

Figure 1:
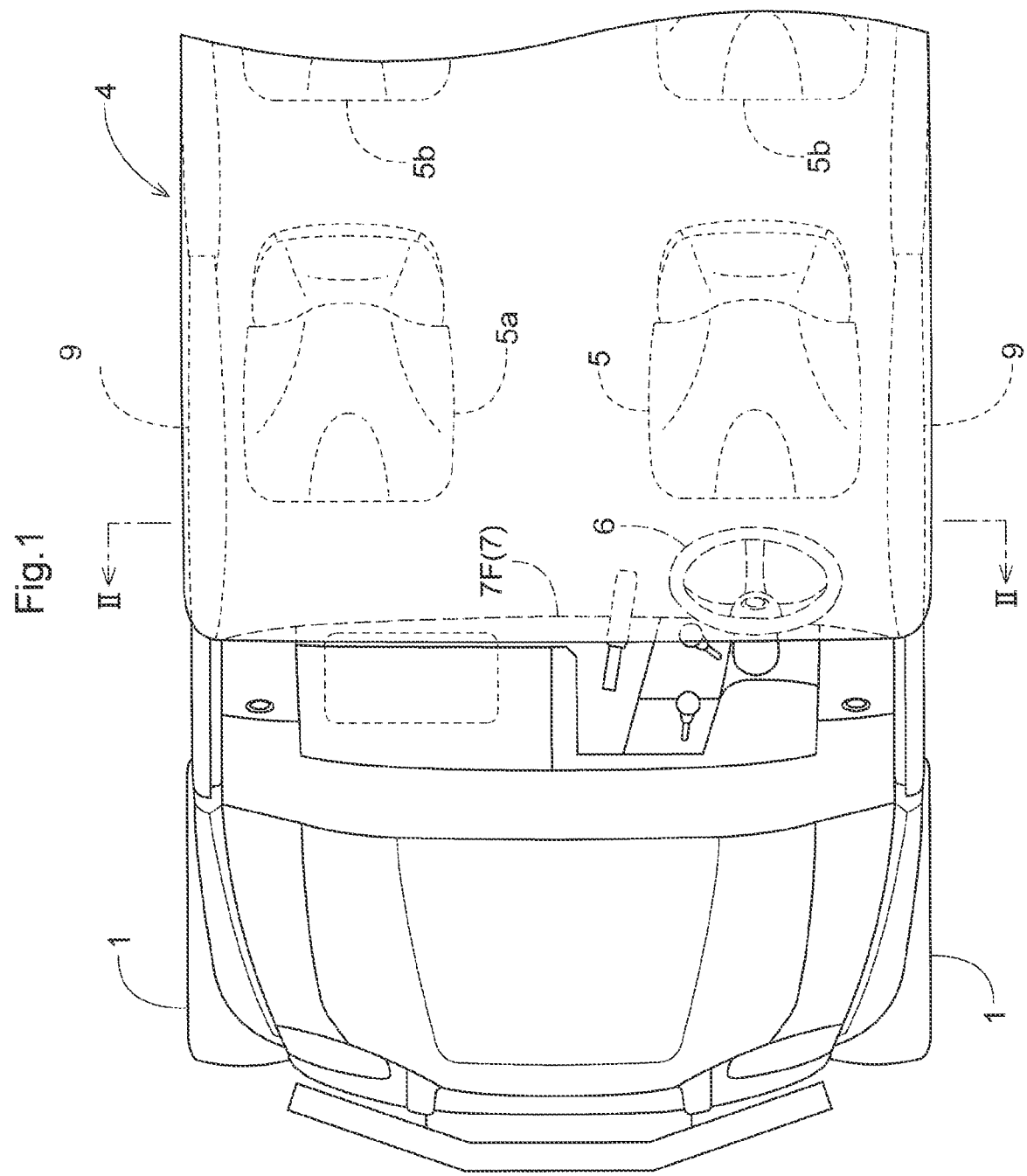
FIG. 1 is a plan view of a front portion of a utility vehicle.

As illustrated in FIG. 1, a utility vehicle includes: a vehicle body including a vehicle body frame (not illustrated) that is an assembly of members such as pipe frame members; a pair of left and right front wheels 1, which are mounted on a front portion of the vehicle body and which are steerable and drivable; and a pair of left and right rear wheels (not illustrated) that are mounted on a rear portion of the vehicle body and that are drivable. The vehicle body also includes a driver section 4, which is for a driver to ride.

[Configuration of Driver Section]

As illustrated in FIG. 1, the driver section 4 includes a driver's seat 5, an auxiliary seat 5a, a plurality of (two) rear seats 5b, and a steering wheel 6, which is for steering the front wheels 1. The driver's seat 5 is disposed at a left area portion of the driver section 4. The auxiliary seat 5a is disposed at a right area portion of the driver section 4. The driver's seat 5 and the auxiliary seat 5a are arranged side by side in a widthwise direction of the vehicle body. One rear seat 5b is disposed at a rear portion of the driver seat 5, and the other rear seat 5b is disposed at a rear portion of the auxiliary seat 5a.

An interior cover 7 is disposed inside the driver section 4. The interior cover 7 has a front cover portion 7F, which serves as a dashboard. The front cover portion 7F is disposed at a position away from the driver's seat 5 and the auxiliary seat 5a in the forward direction of the utility vehicle.

A left door 9 is disposed at a left lateral side portion of the driver section 4, and a right door 9 is disposed at a right lateral side portion of the driver section 4. Each of the right and left doors 9 is supported by hinges (not illustrated) connected to a front portion of the door 9 and is pivotable open and closed on the front portion of the door 9. A door interior cover 7D (see FIG. 2) is disposed at an inner side portion of each door 9. The door interior cover 7D serves as the interior cover 7 for lateral outer portions of the driver's seat 5, the auxiliary seat 5a, and the rear seats 5b.

Steering tools such as the steering wheel 6 are disposed at a left side portion of the front cover portion 7F, that is, at a position opposing the driver's seat 5.

[Configuration of Storage Section]

Figure 2:
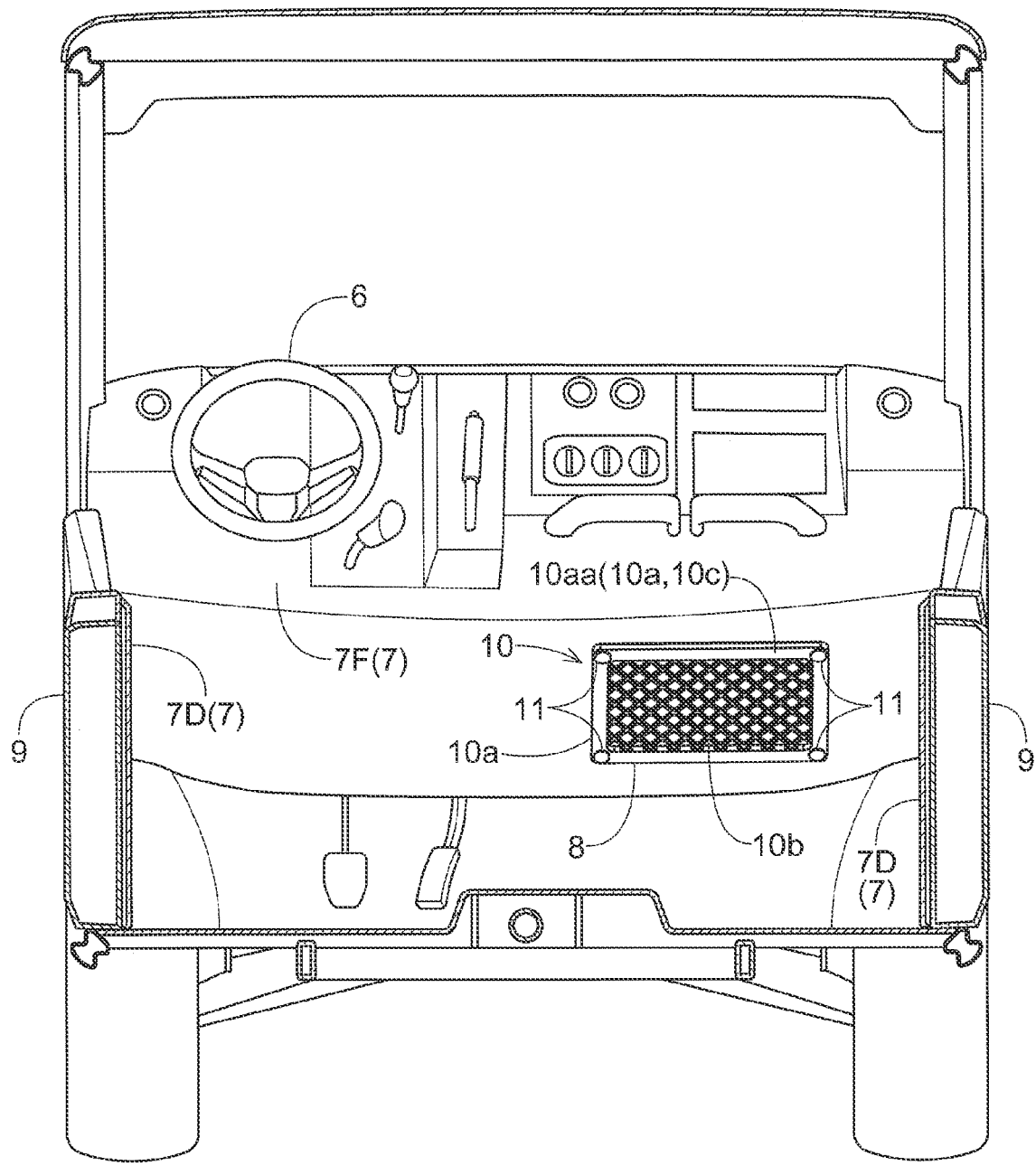
FIG. 2 is a cross-sectional view of the utility vehicle cut along a plane indicated by line II-II illustrated in FIG. 1.

As illustrated in FIG. 2, the interior cover 7 includes an attaching portion 8, at which the storage section 10 is attached to the interior cover 7. The following description of the attaching portion 8 is regarding an example in which the attaching portion 8 is attached to, among portions of the interior cover 7, a surface of a front surface portion of the front cover portion 7F. The attaching portion 8 is disposed at a right area portion of the front cover portion 7F. Four screw holes 8a (see FIG. 3) are formed at portions of the attaching portion 8 which portions respectively correspond to the four corners of the storage section 10.

The storage section 10 includes: an openable portion 10c, through which an object is taken in and out; and a body 10b, in which the object is stored.

The body 10b has a substantially rectangular shape. Four edge members 10a are respectively disposed at four edge portions of the body 10b. The edge members 10a are each made of a stretchable member, such as a cloth, formed by combining stretchable fibers, rubber, or a combination of stretchable fibers and rubber. Screws 11 are respectively passed through the four corners of the storage section 10 and screwed into the respective screw holes 8a. Thus, the storage section 10 is fixed to the attaching portion 8.

The body 10b is formed of a net made of a stretchable member that is formed by combining stretchable fibers, rubber, or a combination of stretchable fibers and rubber. An edge member 10aa is one of the edge members 10a, which are respectively disposed at the four edge portions of the body 10b. The edge member 10aa serves as the openable portion 10c, instead of being bonded and fixed to the surface of the front cover portion 7F. The other edge members 10a, which respectively correspond to the other edge portions of the body 10b, are bonded and fixed to the surface of the front cover portion 7F.

Figure 3:
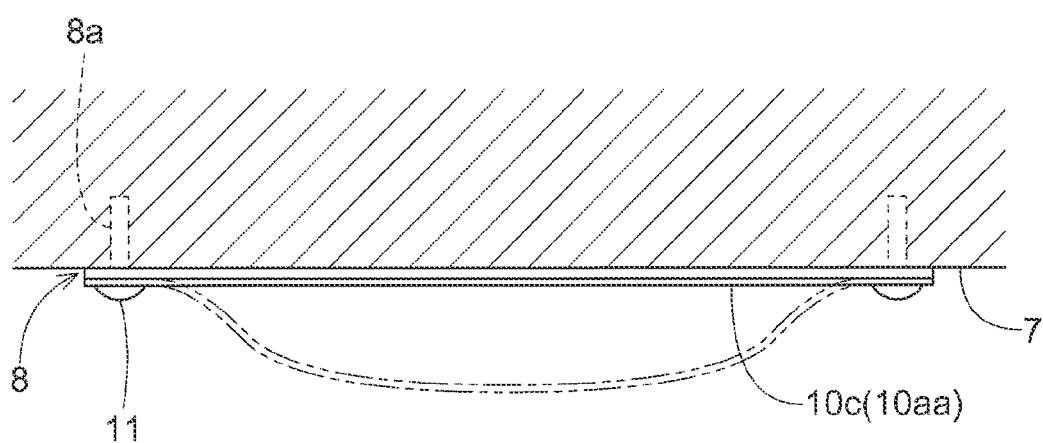
FIG. 3 illustrates a configuration of a storage section.

With this configuration, as indicated by the solid line in FIG. 3, when the storage section 10 is unoccupied, the openable portion 10c and the body 10b extend along a portion of the surface of the interior cover 7 which portion faces the attaching portion 8, which is for attaching the storage section 10 to the interior cover 7. This configuration eliminates the need for securing a large volume of space as the space for installing the storage section 10. This eliminates or minimizes such a disadvantage that the inside space of the driver section 4 is small.

The openable portion 10c is neither bonded or fixed to the surface of the front cover portion 7F, and is formed of a stretchable member. With this configuration, when an object is stored in the storage section 10, the object can be inserted into the body 10b through the opening indicated by the two-dot chain line in FIG. 3. This opening can be formed by the inserting movement of the object or by pulling the object with a hand. In the case of a conventional, box-shaped storage section having a depth, the object stored in the storage section is freely movable in the storage section. If the vehicle vibrates during traveling, the object may collide with the internal wall of the storage section, causing noise and/or damage to the object. In the case of the storage section 10 according to this embodiment of the present invention, however, the object stored in the storage section 10 is fixed by the contracting action of the body 10b, and is prevented from freely moving in the storage section 10. This eliminates or minimizes generation of noise and/or damage to the object.

The storage section 10 is not attached to the utility vehicle in advance. That is, the storage section 10 can be attached to existing utility vehicles by providing the screw holes 8a.

Other Embodiments

Description will be made with regard to embodiments in which the above-described embodiment is modified. A combination of the following other embodiments may be applied to the above-described embodiment insofar as no contradiction occurs. It is to be noted that the scope of the present invention will not be limited to the following other embodiments.

(1) In the above-described embodiment, the storage section 10 is attached to the surface of the front surface portion of the front cover portion 7F of the interior cover 7. This configuration, however, is not intended in a limiting sense. For example, the storage section 10 may be attached to an upper surface portion of the front cover portion 7F. In this case as well, the openable portion 10c and the body 10b extend along a portion of the surface of the front cover portion 7F which portion faces the attaching portion 8, which is for attaching the storage section 10 to the interior cover 7. This eliminates or minimizes such a disadvantage that the field of view of the driver is obstructed by the storage section 10. Another possible embodiment is that the storage section 10 is attached to the door interior cover 7D. The door interior cover 7D is disposed at the inner side portion of each door 9, which is disposed at the lateral outer portions of the driver's seat 5, the auxiliary seat 5a, and the rear seats 5b. In this case as well, it is not necessary to secure as the space for installing the storage section 10. This eliminates or minimizes such a disadvantage that the inside space of the driver section 4 is small.

(2) In the above-described embodiment, the storage section 10 is attached to the interior cover 7. This configuration, however, is not intended in a limiting sense. For example, in a case where the utility vehicle includes a cargo bed, the storage section 10 may be attached to the inner wall surface of the cargo bed.

(3) In the above-described embodiment, the openable portion 10c and the body 10b are each formed of a stretchable member. This configuration, however, is not intended in a limiting sense; one of the openable portion 10c and the body 10b may be formed of a stretchable member.

(4) In the above-described embodiment, the body 10b is formed of a net made of a stretchable member. This configuration, however, is not intended in a limiting sense; the body 10b may be formed of a cloth made of a stretchable member. In this case, the openable portion 10c and the body 10b may be integral with each other.

(5) In the above-described embodiment, when the storage section 10 is unoccupied, the openable portion 10c and the body 10b extend along a portion of the surface of the interior cover 7 which portion faces the attachment position at which the storage section 10 is attached to the interior cover 7. This configuration, however, is not intended in a limiting sense. For example, even when the storage section 10 is unoccupied, the body 10b may have a bag shape detached from the portion of the surface of the interior cover 7 which portion faces the attachment position of the storage section 10.

(6) In the above-described embodiment, the storage section 10 is attached to the attaching portion 8 with the screws 11 and by way of bonding. This configuration, however, is not intended in a limiting sense; the storage section 10 may be attached only with the screws 11 or may be attached only by way of bonding.

(7) In the above-described embodiment, the driver's seat 5 and the auxiliary seat 5a are disposed at the front portion of the driver section 4, and the rear seats 5b are disposed at the rear portion of the driver section 4. This configuration, however, is not intended in a limiting sense. For example, a three-person bench seat may be disposed at each of the front portion and the rear portion of the driver section 4. Another possible embodiment is that a seat is disposed only at the front portion of the driver section 4.

INDUSTRIAL APPLICABILITY

The present invention is applicable to utility vehicles used for personnel transportation, luggage transportation, recreation, and other purposes.

REFERENCE SIGNS LIST

4: Driver section
5: Driver's seat
7: Interior cover
7F: Front cover portion
10: Storage section
10b: Body
10c: Openable portion

The invention claimed is:

1. A utility vehicle comprising:
a driver section configured to accommodate a driver;
an interior cover disposed inside the driver section; and
a storage section attached to a surface of the interior cover and configured to store an object, wherein:
the interior cover comprises an attaching portion having a plurality of screw holes;
the storage section comprises:
an openable portion through which the object is taken in and out;
a body configured to store the object; and
a plurality of edge members disposed at each edge portion of the body,
the openable portion is in a form of a stretchable member,
the body is in a form of a stretchable net,
the plurality of edge members are each comprised of a stretchable member, and
a plurality of screws are passed through the edge members such that at least one screw of the plurality of screws is passed through each of four corners of the storage section and into respective screw holes of the plurality of screw holes to fix the storage section to the attaching portion.

2. The utility vehicle according to claim 1, wherein the body is in a form of a stretchable member.

3. The utility vehicle according to claim 2, wherein the openable portion and the body are integral with each other.

4. The utility vehicle according to claim 1, further comprising:
a driver's seat disposed in the driver section, and
wherein the storage section is disposed at a front cover portion of the interior cover, and the front cover portion is away from the driver's seat in a forward direction.

5. The utility vehicle according to claim 1, wherein when the storage section is unoccupied, the openable portion and the body of the storage section extend along a portion of the surface of the interior cover and the portion of the surface faces a position at which the storage section is attached to the interior cover.

* * * * *